US012580509B2

(12) United States Patent (10) Patent No.: US 12,580,509 B2
Price et al. (45) Date of Patent: Mar. 17, 2026

(54) SYNCHRONIZED DUAL ACTIVE BRIDGE

(71) Applicant: IRP NEXUS GROUP LTD, Nes Ziona (IL)

(72) Inventors: Paul Price, Nes-Ziona (IL); Shmuel Ben Yaakov, Tel Yitzhak (IL)

(73) Assignee: IRP NEXUS GROUP LTD, Nes-Ziona (IL)

( * ) Notice: Subject to any disclaimer, the term of this patent is extended or adjusted under 35 U.S.C. 154(b) by 149 days.

(21) Appl. No.: 18/564,178

(22) PCT Filed: May 26, 2022

(86) PCT No.: PCT/IL2022/050560
§ 371 (c)(1),
(2) Date: Nov. 27, 2023

(87) PCT Pub. No.: WO2022/249187
PCT Pub. Date: Dec. 1, 2022

(65) Prior Publication Data
US 2024/0258949 A1 Aug. 1, 2024

(30) Foreign Application Priority Data

May 26, 2021 (IL) ............................................ 283482
Nov. 15, 2021 (IL) ............................................ 288129

(51) Int. Cl.
*H02P 27/08* (2006.01)
*H02P 23/10* (2006.01)
*H02P 25/03* (2016.01)

(52) U.S. Cl.
CPC .............. *H02P 27/08* (2013.01); *H02P 23/10* (2013.01); *H02P 25/03* (2016.02)

(58) Field of Classification Search
CPC ........... H02P 23/10; H02P 25/03; H02P 27/08
See application file for complete search history.

(56) References Cited

U.S. PATENT DOCUMENTS 8,824,167 B2 * 9/2014 Hughes ............. H02M 3/33507
363/17
9,673,721 B2 * 6/2017 Trescases .......... H02M 3/33592
(Continued)

FOREIGN PATENT DOCUMENTS

CN 202218161 U 5/2012
CN 206775390 U 12/2017
(Continued)

OTHER PUBLICATIONS

Ramakrishnan, H. "Bi-Directional, Dual Active Bridge Reference Design for Level 3 Electric Vehicle Charging Stations." Design Guide: TIDA-010054, pp. 1-86, Jun. 2019.
(Continued)

*Primary Examiner* — Thai T Dinh
(74) *Attorney, Agent, or Firm* — SALIWANCHIK, LLOYD & EISENSCHENK

(57) ABSTRACT

A system for controlling an electric motor by implementing a synchronized bidirectional rotary dual active bridge, comprising a rotary transformer having a primary side and a secondary side; a first inverter being a first full active bridge, connected between an AC power source and the primary side; a second inverter being a second full active bridge, connected to the secondary side and feeding the load current to the rotor of an electric motor via the secondary side; a control circuit, for transmitting square wave synchronization pulses at the switching frequency of the inverters, to operate the second full active bridge independent of the first full active bridge. At the primary side, the phase and the operating duty cycle of the first full active bridge are controlled to be in synchronization with the synchronization pulses, to thereby vary the current provided by the second full active bridge to the rotor.

20 Claims, 15 Drawing Sheets

(56)  References Cited

U.S. PATENT DOCUMENTS

| | | | | | |
|---|---|---|---|---|---|
| 10,122,367 | B1 * | 11/2018 | Albertini | .......... | H02M 3/33584 |
| 10,576,828 | B2 * | 3/2020 | Thongam | .............. | H02M 3/158 |
| 11,190,104 | B2 * | 11/2021 | Hu | ................... | H02M 3/33523 |
| 11,349,399 | B2 * | 5/2022 | Nakahara | .......... | H02M 3/33507 |
| 11,894,787 | B2 * | 2/2024 | Znaty | ........................ | H02P 6/15 |
| 2016/0020702 | A1 * | 1/2016 | Trescases | .......... | H02M 3/33592 |
| | | | | | 363/17 |

FOREIGN PATENT DOCUMENTS

| | | | |
|---|---|---|---|
| CN | 211557153 | U | 9/2020 |
| JP | 2020-150574 | A | 9/2020 |
| WO | 2019/199964 | A1 | 10/2019 |

OTHER PUBLICATIONS

Pavlović, Zoran et al. "Bidirectional Dual Active Bridge Series Resonant Converted with Pulse Modulation." Twenty-Seventh Annual IEEE Applied Power Electronics Conference and Exposition (APEC), pp. 1-6, Feb. 5, 2012.

* cited by examiner

Fig. 10a                    Fig. 10b

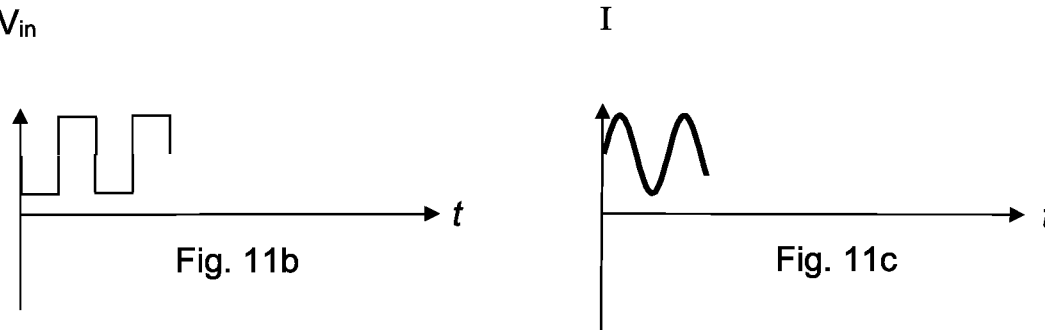
Fig. 11b
Fig. 11c
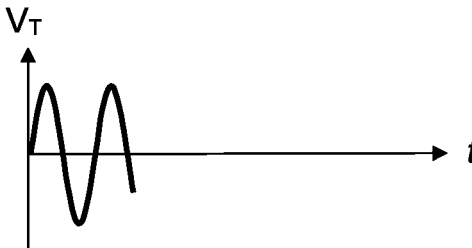
Fig. 11d
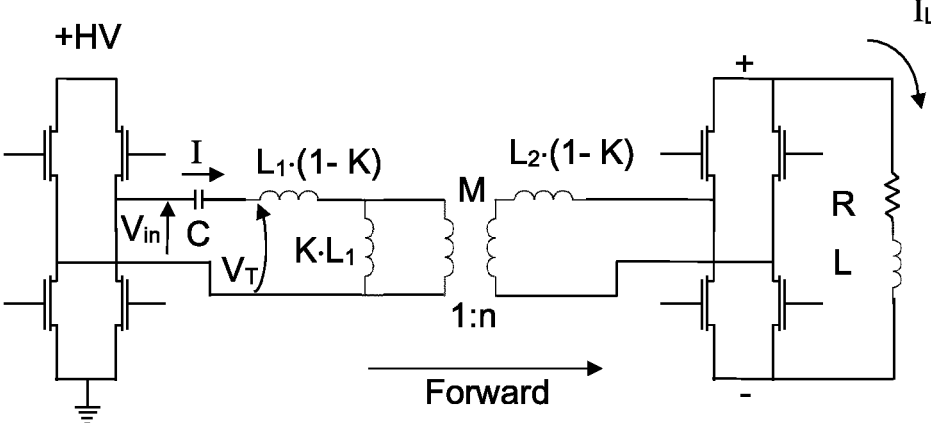
Fig. 12

SYNCHRONIZED DUAL ACTIVE BRIDGE

CROSS REFERENCE TO RELATED APPLICATIONS

This application is a National Stage Application of International Application Number PCT/IL2022/050560, filed May 26, 2022; which claims priority to Israel Patent Application No. 283482, filed on May 26, 2021, and Israel Patent Application No. 288129, filed Nov. 15, 2021, all of which are incorporated herein in their entirety.

FIELD OF THE INVENTION

The present invention relates to the field of electrical power transfer. More particularly, the present invention relates to a system and method for controlling bidirectional and bipolar power transfer to loads such as Direct Current (DC)-excited synchronous electric motors that apply a rotary transformer driven by a synchronized dual active bridge.

BACKGROUND OF THE INVENTION

Synchronous motors are widespread and have many practical applications, such as powering electric cars. A synchronous electric motor is an AC motor in which, at steady state, the rotation of the rotor is synchronized with the frequency of the current supplied to the stator. The rotation frequency is equal to an integral number of AC cycles.

The rotation of the synchronous motor is a result of the interaction between the rotating magnetic field formed by the stator and the magnetic field of the rotor. The latter could be based on an array of permanent magnets or on wire wound coils that are fed by a DC current, to build the magnetic field of the rotor. DC-excited synchronous motors require the transfer of DC current to the rotating rotor.

FIG. 1 (prior art) schematically illustrates a simplified cross-sectional view of the DC-excited synchronous motor. The motor 100 consists of a stator 101 inside which a rotor 102 is mounted using bearings 103. Brushes 106 and slip-rings 105 are then used to feed current from a power supply 104 to the rotating rotor 102. However, using a combination of brushes and slip-rings is problematic, since they suffer from wear, as well as dirt that penetrates the moving contacts. In addition, some applications require inserting the motor into a fluid for cooling which may hamper the electrical conduction between the brushes and the slip rings.

One of the existing solutions for replacing the combination of brushes and slip-rings is using a rotary transformer, as shown in FIG. 2 (prior art). The rotary transformer 200 consists of two parts 201 and 202 with magnetic coupling between them.

Since a transformer (either stationary or rotary) can only pass AC voltage, transferring DC current to the rotor coils is done by first feeding the rotary transformer by an AC signal and then rectifying the output voltage, at the secondary of the transformer, using diodes, as shown in FIG. 3 (prior art). The rotor 102 may be described as a large inductor $L_R$ with ohmic losses $R_R$. This way, current (electrical energy) is delivered from the primary side 30 to the secondary side 31 and into the rotor ($L_R$) in a controllable manner, in order to rotate the rotor at a desired speed. The array of diodes 300 is used to rectify the delivered AC current, in order to provide DC current to the rotor.

During operation, the current must be controlled both by reducing it or by increasing it. FIGS. 4A-4C (prior art) shows typical required variations in the rotor current. Basically, the current direction is kept positive (from the bridge into the rotor), but variations are needed for controlling the speed and torque of the motor (such as for electric cars).

FIG. 4A (left) shows a typical variation in the rotor current 301. An increase in the rotor current is obtained by increasing the amplitude of the AC voltage of the primary 30, while a decrease in the current is achieved by decreasing the amplitude of said AC voltage. The maximum rate of decrease, when the said AC voltage is zero is given by:

$$I(t)=I_0e^{-t/\tau} \text{ where } \tau=L_R/R_R \qquad (102)$$

Fast reducing of the current requires that the changing rate (dI/dt) will be negative ($V_{av}<V_R=IR_R$, as shown in the graph of FIG. 4B (left, 302). However, the rate of current decrease with even zero voltage at the secondary of the rotary transformer, is controlled by the time constant of the rotor network ($\tau=L_R/R_R$) resulting in practical cases in a slow rate of current decrease. Fast negative (dI/dt) requires a negative average voltage to be fed to the rotor. Since the diodes 300 can produce only a positive voltage, there is a need for an active synchronous rectification that can produce both positive and negative voltage as illustrated in FIG. 4C.

FIG. 4C (prior art) shows using FETs (or another type of transistors) as a synchronous rectifier to control the rotor current. In this implementation, by properly controlling the switching scheme of the 4 FETS Q1, Q2, Q3, Q4, with respect to the output voltage of the rotating transformer, it is possible to obtain both positive and negative output voltage. For example, if Q1 and Q4 will conduct when the signal coming out of the secondary side of the transformer is positive, the overall voltage across the rotor will be positive. On the other hand, if Q2 and Q3 will conduct, when the signal coming out of the secondary side of the transformer is positive, the overall voltage across the rotor will be negative and the current of the rotor decreases faster. Conversely, if the momentary voltage coming out of the secondary of the transformer is negative, Q1 and Q4 conduction will produce a negative voltage at the output, while Q2, Q3 conduction will produce a positive voltage. However, the operation of the synchronous rectifier requires an additional link from the stator side to the rotor, to control the switches (e.g. the gates of the FETs)

In other applications, power transfer is also required to be bipolar and bidirectional. For example, a battery needs to be charged before being discharged to the load. The problem to be solved is, therefore, how to deliver electrical power from the primary side to the secondary side and vice versa, along with the information required for properly controlling the synchronous switches Q1-Q4 to obtain power transfer in the desired direction and rate. To solve this problem, other existing solutions use two channels such as two rotating transformers, one for delivering electrical power and one for sending the control commands from the primary side to the secondary side.

However, all the existing solutions are cumbersome since they require a data link to pass the multitude control signals from the primary side to the secondary side and processing them in the secondary side (decoding, etc.), in order to extract the required control information.

Other applications may require bidirectional data transfer to transmit, for example, the amplitude of the rotor's current to the stator side. This, according to existing solutions, will require additional elaborated hardware.

It is therefore an object of the present invention to provide a system and method for controlling DC-excited synchronous electric motors that do not require brushes and slip-rings.

It is another object of the present invention to provide a system and method for controlling bidirectional and bipolar power transfer that are reliable and require only a single data link while the processing of the switching information is mainly in the primary side of the system.

Other objects and advantages of the invention will become apparent as the description proceeds.

SUMMARY OF THE INVENTION

A method for controlling a synchronized bidirectional dual active bridge power transfer system, comprising the steps of:
 a) providing a transformer having a primary side and a secondary side;
 b) connecting a first inverter being a first full active bridge between a power source and the primary side;
 c) connecting a second inverter being a second full active bridge to the secondary side and feeding current to a load via the secondary side;
 d) continuously transmitting, by a control circuit and via the transformer, synchronization pulses at the switching frequency of the inverters, to operate the second full active bridge independent of the first full active bridge;
 e) processing the synchronization pulses to obtain an essentially square wave signal that independently operates the second full active bridge to feed the load with predetermined current originated from passing power from the AC power source to the second full active bridge, via the rotary transformer; and
 f) at the primary side, controlling the phase and the operating duty cycle of the first full active bridge, being in synchronization with the synchronization pulses, to thereby vary the current provided by the second full active bridge to the load.

The synchronization pulses may be in the form of a square wave signal that passes via the transformer from the primary side to the secondary side.

The synchronization pulses may be in the form of short pulses that pass via the transformer from the primary side to the secondary side and are processed at the secondary side to reconstruct the square wave signal at the secondary side.

The square wave signal may be reconstructed at the secondary side by a PLL circuit.

The power transfer between the sides of the transformer may be bidirectional.

The full-bridge inverters may be implemented by controllable switches being transistors.

The phase of the drive signals, with respect to the synchronization signal, may determine the polarity and the magnitude of the voltage that is being developed at the output of the secondary side.

Whenever the average voltage of the modulated waveform is positive and higher than the voltage across the load, dI/dt is positive and the current flowing in the secondary side will increase.

Whenever the average voltage of the modulated waveform is negative, dI/dt is negative and the current flowing in the secondary side will decrease.

A primary control circuit may be used to control the full bridge at the primary side to modify the phase of the generated waveform with respect to the synchronization signal, so as to increase the current at a desired rate, decrease the current flowing in the secondary side at a desired rate, or reverse the current direction.

A method for controlling an electric motor by implementing a synchronized bidirectional rotary dual active bridge, comprising the steps of:
 a) providing a rotary transformer having a primary side and a secondary side;
 b) connecting a first inverter being a first full active bridge between an AC power source and the primary side;
 c) connecting a second inverter being a second full active bridge to the secondary side and feeding current to the rotor of the electric motor via the secondary side;
 d) continuously transmitting, by a control circuit and via the rotary transformer, synchronization pulses at the switching frequency of the inverters, to operate the second full active bridge independent of the first full active bridge;
 e) processing the synchronization pulses to obtain an essentially square wave signal that independently operates the second full active bridge to feed the rotor with predetermined current originated from passing power from the AC power source to the second full active bridge, via the rotary transformer; and
 f) at the primary side, controlling the phase and the operating duty cycle of the first full active bridge, being in synchronization with the synchronization pulses, to thereby vary the current provided by the second full active bridge to the rotor.

The phase of the drive signals, with respect to the synchronization signal, determines the polarity and the magnitude of the voltage that is being developed across the rotor.

A primary control circuit may be used to control the full bridge at the primary side to modify the synchronization (command) signals, so as to increase the current at a desired rate, decrease the current at a desired rate, or reverse the current direction.

The synchronization (command) signals from the primary side to the secondary side are passed using optical signals.

The synchronization (command) signals from the primary side to the secondary side may be passed using magnetic coupling.

The synchronization (command) signals from the primary side to the secondary side are passed using capacitive coupling.

An open ring electrode may be mounted on each surface of the rotary transformer which implements the capacitive coupling, on top of an insulating layer.

A guard layer may be added at each side of the rotary transformer.

A segmented open ring electrode may be mounted on each surface of the rotary transformer, which implements the capacitive coupling, on top of an insulating layer, to thereby allow multichannel data transfer.

A segmented open ring electrode may be mounted on each surface of the rotary transformer, which implements the capacitive coupling, on top of an insulating layer, to thereby allow bidirectional data transfer.

The primary side may further comprise a serially connected resonating capacitor at the input, for obtaining resonance with serial stray inductance caused by weak magnetic coupling, at the switching frequency, thereby operating as a bidirectional resonant converter.

A second bridge may be connected in tandem to the first bridge at the secondary side, which during forward power transfer, feeds a load or the rotor of the electric motor, such that current flows from the positive port of the synchronous rectifier into the load.

A second bridge at the secondary side may be connected in tandem to the first bridge which during backward power transfer, feeds a load or the rotor the electric motor, such that current flows from the load into the positive port of the first bridge. The first bridge operates as an inverter that feeds an AC signal to the secondary winding of the transformer.

The synchronous rectifier may feed a load or the rotor of the electric motor via an additional full-bridge consisting of two pairs of opposing transistors and functioning as a polarity switch, such that:

during forward power transfer, a) controlling two non-opposing transistors, one from each pair of the full-bridge, to conduct while controlling the other two non-opposing transistors not to conduct, thereby allowing current to flow from the positive port of the synchronous rectifier into the load; and during backward power transfer, b) controlling the other two non-opposing transistors, one from each pair of the full-bridge, to conduct while controlling the remaining two non-opposing transistors to conduct, thereby allowing current to flow from the load into the negative port of the first bridge which now acts as an inverter to facilitate power transfer to the primary, while maintaining its positive voltage polarity of first bridge.

A MOSFET transistors bridge may be used to feed a load or the rotor of the electric motor, whereas each of the half bridges consists of an upper and a lower pair of transistors in a back-to back connection, such that the bridge is bidirectional and can accommodate bipolar voltage across it, while:

during forward power transfer, a) controlling the lower transistors of each back-to-back connected pairs of the bridge at the secondary to conduct, while controlling the other two opposing transistors of the pair not to conduct, thereby applying a short-circuit on the internal diodes of the conducting transistors, and thus, forming a diode rectifier which allows the current to flow from the secondary side of the transformer via the internal diodes being arranged as a bridge, into the load;

during backward power transfer, concurrently:

b) controlling the upper back-to-back transistor pairs to conduct;

c) controlling the remaining transistors to operate as an inverter such that current is flowing out of the load, converted to an AC signal and fed to the secondary winding of the transformer, thereby reversing the polarity of the voltage across bidirectional and bipolar bridge which now acts as an inverter and thereby, allowing current to flow from the load to the secondary side and then to the primary side of transformer.

The power transfer level of the inverter on the primary side may be controlled by shifting the switching frequency, to thereby vary the current. The frequency range may be above the resonant frequency.

The inverter on the primary side may be controlled to produce a bipolar pulse width modulated signal, to thereby generate a duty cycle which varies the current.

A synchronized bidirectional dual active bridge power transfer system, comprising:

a) a transformer having a primary side and a secondary side;

b) a first inverter being a first full active bridge, connected between a power source and the primary side;

c) a second inverter being a second full active bridge, connected to the secondary side and feeding current to a load via the secondary side;

d) a control circuit for:

d.1) continuously transmitting, via the transformer, synchronization pulses at the switching frequency of the inverters, to operate the second full active bridge independent of the first full active bridge;

d.2) processing the synchronization pulses to obtain an essentially square wave signal that independently operates the second full active bridge to feed the load with predetermined current originated from passing power from the AC power source to the second full active bridge, via the rotary transformer; and d.3) controlling, at the primary side, the phase and the operating duty cycle of the first full active bridge, being in synchronization with the synchronization pulses, to thereby vary the current provided by the second full active bridge to the load.

The synchronization pulses may be in the form of a square wave signal that passes via the transformer from the primary side to the secondary side.

The synchronization pulses may be in the form of short pulses that pass via the transformer from the primary side to the secondary side and processed at the secondary side to reconstruct the square wave signal at the secondary side.

The system may further comprise a PLL circuit for reconstructing the square wave signal at the secondary side.

The system may comprise a primary control circuit for controlling the full bridge at the primary side to modify the phase of the generated waveform with respect to the synchronization signal, so as to increase the current at a desired rate, decrease the current flowing in the secondary side at a desired rate, or reverse the current direction.

A system for controlling an electric motor by implementing a synchronized bidirectional rotary dual active bridge, comprising:

a) a rotary transformer having a primary side and a secondary side;

b) a first inverter being a first full active bridge, connected between an AC power source and the primary side;

c) a second inverter being a second full active bridge, connected to the secondary side and feeding current to the rotor of the electric motor via the secondary side;

d) a control circuit, for:

d.1) continuously transmitting, via the rotary transformer, synchronization pulses at the switching frequency of the inverters, to operate the second full active bridge independent of the first full active bridge;

d.2) processing the synchronization pulses to obtain an essentially square wave signal that independently operates the second full active bridge to feed the rotor with predetermined current originated from passing power from the AC power source to the second full active bridge, via the rotary transformer; and d.3) at the primary side, controlling the phase and the operating duty cycle of the first full active bridge, being in synchronization with the synchronization pulses, to thereby vary the current provided by the second full active bridge to the rotor.

An open ring electrode may be mounted on each surface of the rotary transformer which implements the capacitive coupling, on top of an insulating layer.

A guard layer may be added at each side of the rotary transformer.

A segmented open ring electrode may be mounted on each surface of the rotary transformer, which implements the capacitive coupling, on top of an insulating layer, to thereby allow multichannel data transfer.

A segmented open ring electrode may be mounted on each surface of the rotary transformer, which implements the capacitive coupling, on top of an insulating layer, to thereby allow bidirectional data transfer.

The system may further comprise at the primary side, a serially connected resonating capacitor at the input, for obtaining resonance with serial stray inductance caused by weak magnetic coupling, at the switching frequency, thereby operating as a bidirectional resonant converter.

The system may further comprise a second bridge at the secondary side, being connected in tandem to the first bridge which during backward power transfer, feeds a load or the rotor the electric motor, such that current flows from the load into the positive port of the first bridge, the first bridge operates as an inverter that feeds an AC signal to the secondary winding of the transformer.

The synchronous rectifier may feed a load or the rotor of the electric motor via an additional full-bridge consisting of two pairs of opposing transistors and functioning as a polarity switch, such that:

during forward power transfer, a) controlling two non-opposing transistors, one from each pair of the full-bridge, to conduct while controlling the other two non-opposing transistors not to conduct, thereby allowing current to flow from the positive port of the synchronous rectifier into the load; and during backward power transfer, b) controlling the other two non-opposing transistors, one from each pair of the full-bridge, to conduct while controlling the remaining two non-opposing transistors to conduct, thereby allowing current to flow from the load into the negative port of the first bridge which now acts as an inverter to facilitate power transfer to the primary, while maintaining its positive voltage polarity of first bridge.

A MOSFET transistors bridge may feed a load or the rotor of the electric motor, whereas each of the half bridges consists of an upper and a lower pair of transistors in a back-to back connection, such that the bridge is bidirectional and can accommodate bipolar voltage across it, while:

during forward power transfer, a) controlling the lower transistors of each back-to-back connected pairs of the bridge at the secondary to conduct, while controlling the other two opposing transistors of the pair not to conduct, thereby applying a short-circuit on the internal diodes of the conducting transistors, and thus, forming a diode rectifier which allows the current to flow from the secondary side of the transformer via the internal diodes being arranged as a bridge, into the load;

during backward power transfer, concurrently:

b) controlling the upper back-to-back transistor pairs to conduct;

c) controlling the remaining transistors to operate as an inverter such that current is flowing out of the load, converted to an AC signal and fed to the secondary winding of the transformer, thereby reversing the polarity of the voltage across bidirectional and bipolar bridge which now acts as an inverter and thereby, allowing current to flow from the load to the secondary side and then, to the primary side of transformer.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein:

FIGS. 10a-10c show the effect of leakage inductance in a transformer;

FIGS. 11a-11d illustrate an embodiment of operating at resonance;

FIG. 12 illustrates an embodiment of operating at the resonant frequency of FIG. 11a, while feeding a load via a synchronous rectifier at the secondary;

DETAILED DESCRIPTION OF THE PRESENT INVENTION

The present invention proposes a system and method for implementing a synchronized bidirectional rotary dual active bridge, to control synchronized electric motors as well as other rotary and non-rotary systems that require controllable bipolar and bidirectional power transfer. The proposed method is reliable and require the processing of the switching information mainly in the primary side of a rotary transformer, as will be described later on.

Figure 4A:
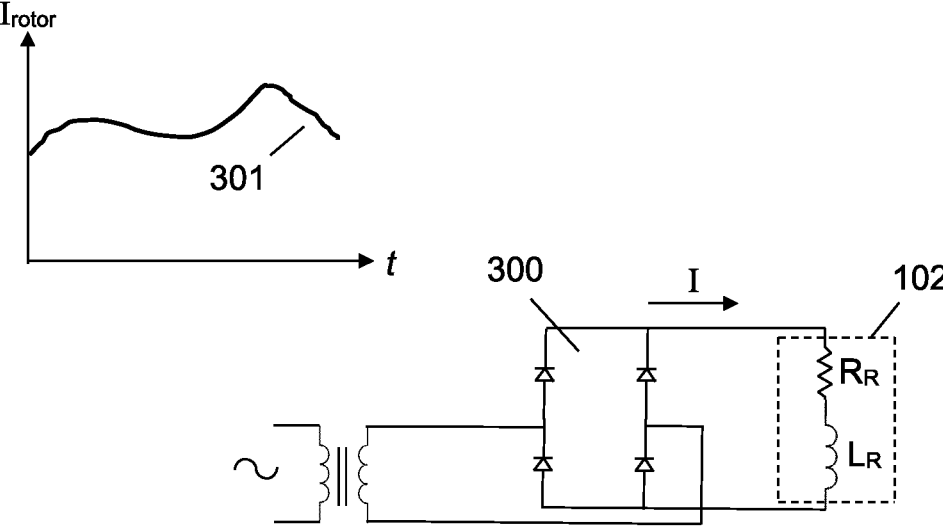
FIGS. 4A-4C (prior art) shows typical required variations in the rotor current.
Figure 4B:
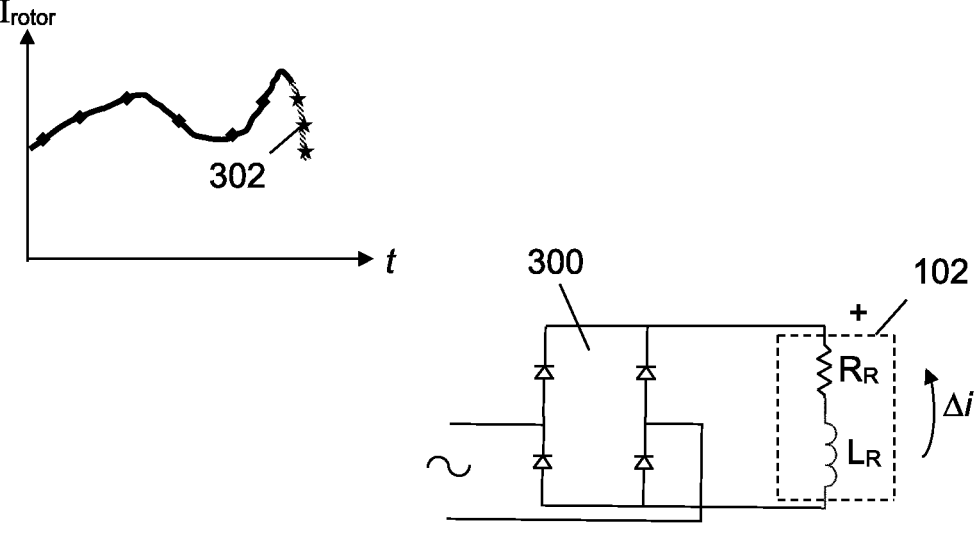
Figure 4C:
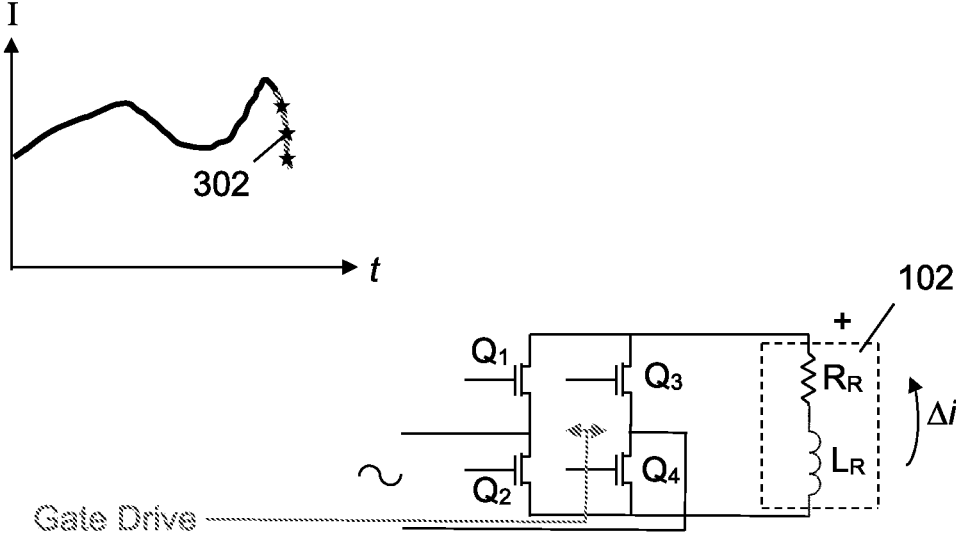
Figure 5:
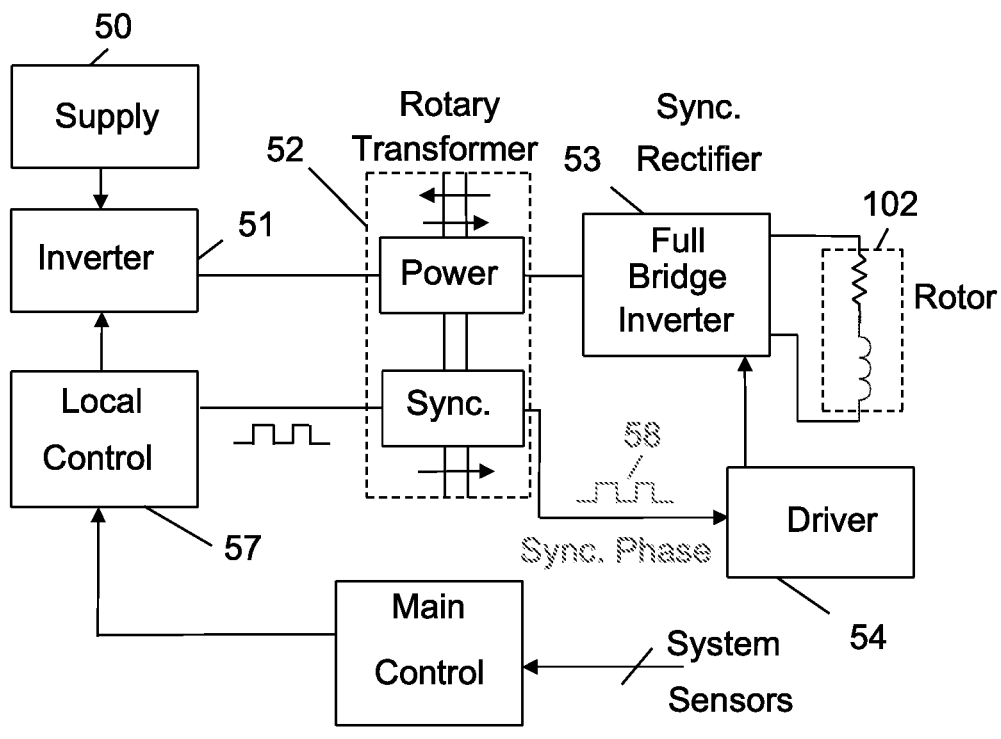
FIG. 5 is a schematic illustration of a circuitry for implementing a synchronized bidirectional rotary dual active bridge, according to an embodiment of the invention.

FIG. 5 is a schematic illustration of a circuitry for implementing a synchronized bidirectional rotary dual active bridge, according to an embodiment of the invention. In this implementation, the electrical power is delivered from the power supply 50 (which is typically an AC power source) via an inverter 51 to the rotor via a rotary transformer 52 and a full-bridge inverter 53, where the power transfer is bidirectional. The control commands (i.e., the switching information to the full-bridge inverter 53) are also delivered via the rotary transformer 52 to a driver 54 that drives the full-bridge inverter 53. One possible implementation of the inverter 53 is by transistors (Q1-Q4) similar to the example of FIG. 4C above, and operates such that during half of the switching period Q1 and Q4 conduct and during the other half of the other switching period, Q3 and Q3 conduct. This mode of operation actually implements a bipolar and bidirectional synchronous rectifier. The operation of the full-bridge inverter 53 is continuous and follows a synchronization pulse 58 transferred from the primary side and is independent of the rectification polarity and current direction.

The magnitude and polarity of the rectified signal at the secondary side, is determined by the phase shift between the primary inverter 51 and secondary inverter 53. While the phase of the secondary inverter is locked to a fixed synchronization signal 58, the phase of the primary inverter 51 is controlled by a local controller 57, to determine the polarity and the magnitude of the voltage that is being developed across the rotor 102. If the phase of the driving signal is aligned with respect to the phase of the pulses that independently drive the full-bridge inverter 53, the voltage that is being developed across the rotor will be positive. If the phase of the control signal will be changed to be negative (opposite) with respect to the phase of the pulses that independently drive the full-bridge inverter 53, the voltage that is being developed across the rotor will be negative. Hence, by properly controlling the phase of the control signal in the primary side, it is possible to determine the polarity of the voltage, as well as the magnitude of this voltage. The pulses that independently drive the full-bridge inverter 53 and the pulses of the control signal may have different duty cycles, where this difference determines the average magnitude of the voltage that is being developed across the rotor. The operation of the power transfer according to this invention is further illustrated by FIGS. 6-9. A control circuit continuously transmits, by and via the transformer, synchronization pulses at the switching frequency of the inverters, to operate the second full active bridge, independent of the first full active bridge. The phase and the operating duty cycle of said first full active bridge (which are in synchronization with the synchronization pulses), are controlled at the primary side, to vary the current provided by the second full active bridge to the load.

Figure 6:
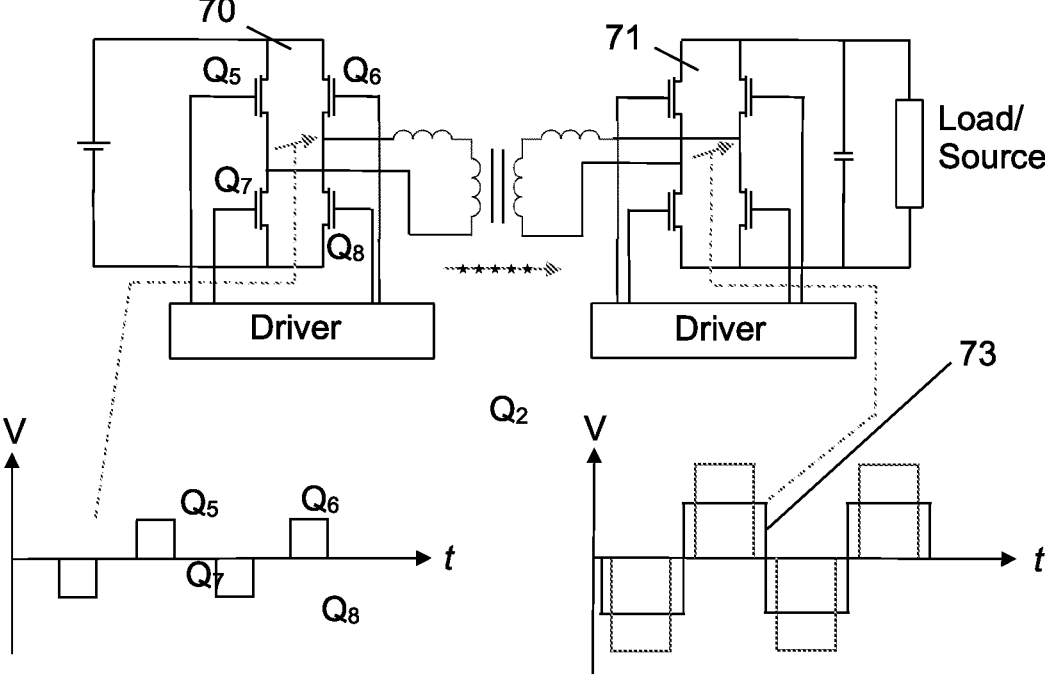
FIG. 6 shows the operation of the system illustrated in FIG. 5 when for a positive output voltage.
Figure 7:
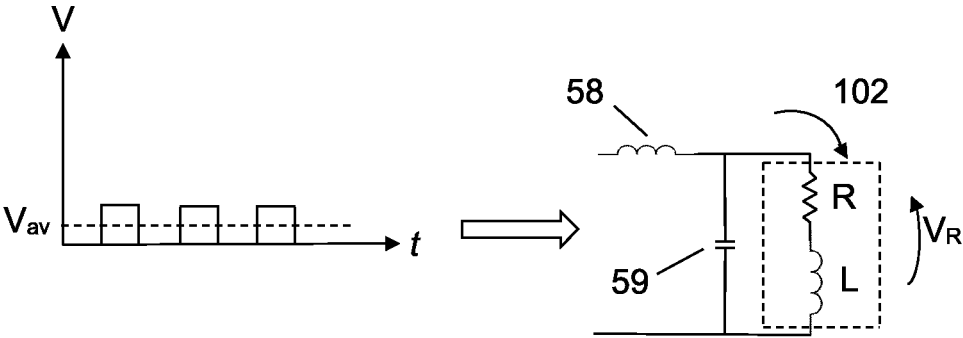
FIG. 7 illustrates the smoothing of the pulsating signal by the leakage inductance and a filter capacitor when the output is positive.

FIG. 6 shows the operation when for a positive output voltage. In this case, the phase of the primary voltage 72 is aligned with the phase of the secondary voltage 73 which results in a positive voltage drive at the secondary as illustrated in FIG. 7. The pulsating signal is smoothed by the leakage inductance 58 and a filter capacitor 59 when the output is positive. At steady state $$V_R = V_{av} \text{ and } I = V_R/R$$

Figure 8:
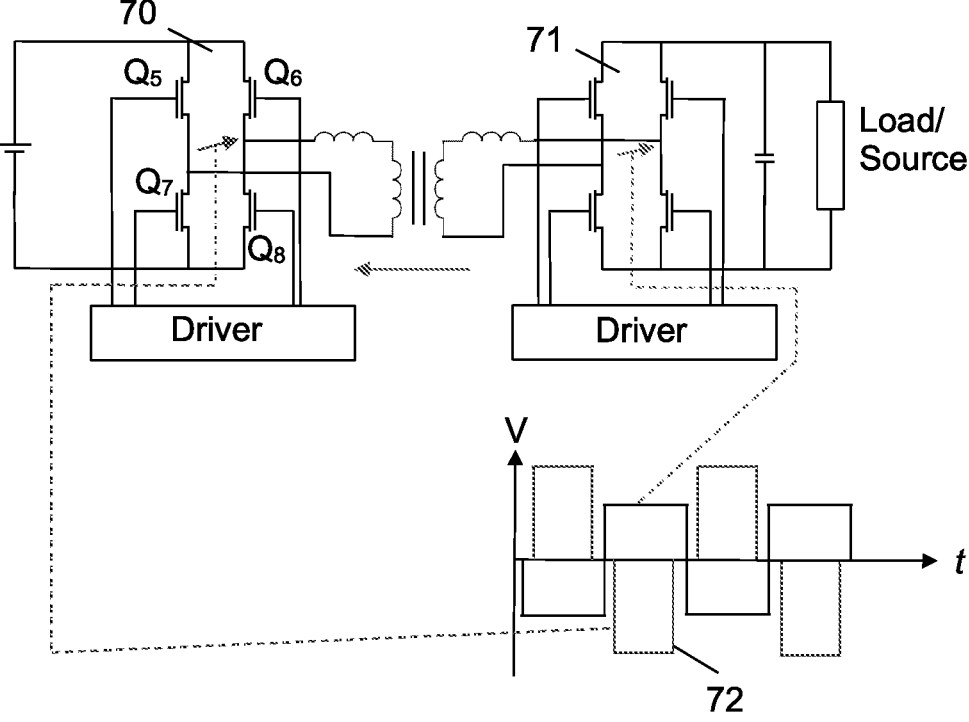
FIG. 8 shows the operation of the system illustrated in FIG. 5 when the output parity is negative.
Figure 9:
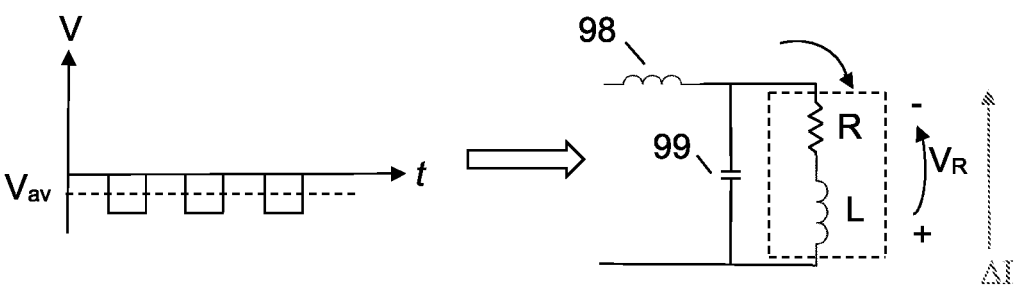
FIG. 9 illustrates the smoothing of the pulsating signal by the leakage inductance and a filter capacitor when the output is negative.

FIG. 8 illustrates the operation when the output polarity is negative. In this case, the phase of the primary signal 72 is reversed with respect to the secondary signal 73 resulting in a negative voltage drive to the rotor. FIG. 9 illustrates the smoothing of the pulsating signal by the leakage inductance 98 and a filter capacitor 99 when the output is negative. As would be clear to a person skilled in the art, this configuration, therefore, allows all the required control of magnitude and polarity of the output to be performed in the primary side while requiring only a synchronization signal to be sent from primary to secondary.

For the sake of clarity, the above description of the embodiment of the present invention, illustrated by FIGS. 5-9, is based on Pulse Width Modulation (PWM). As would be clear to a person skilled in the art, and illustrated in the following description, other modulation methods such as methods using an LC resonant tank, an LLC resonant tank, an LCL resonant tank and the like, can be equally applied for energy transfer in a system according to the present invention.

Figure 10C:
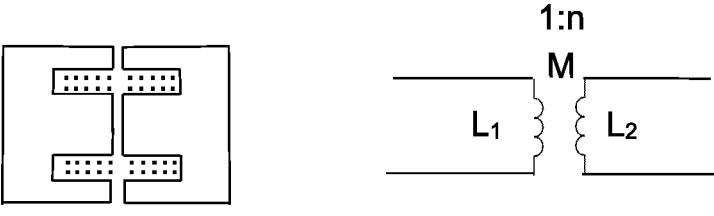

FIGS. 10a-10c show the effect of leakage inductance in a transformer. A transformer (shown in FIG. 19a) may be illustrated as two coils L1 and L2 with magnetic coupling M between them (shown in FIG. 19b), such that $M = K\sqrt{L1 \cdot L2}$, where K is the coupling coefficient (which becomes smaller with smaller distance between the transformer sides), where $0 < K < 1$.

FIG. 10c shows an equivalent circuit for a transformer with $K < 1$ between the primary and the secondary. It can be seen that the primary comprises a primary inductance $K \cdot L1$ and an uncoupled inductance portion $L1 \cdot (1-K)$. The secondary comprises an uncoupled inductance portion $L2 \cdot (1-K)$. T is an ideal transformer with a turn ratio of 1:n where $n = \sqrt{L2^2/L1^2}$. Both uncoupled inductance portions result from magnetic fluxes that are not common to the two windings. When the coupling between the primary and the secondary is strong, $K \approx 1$ and the uncoupled portions are zero. The inductance portions $L1 \cdot (1-K)$ and $L2 \cdot (1-K)$ have impedances that cause voltage drop both in the primary and the secondary sides and therefore, in order to obtain a desired voltage in the secondary, a higher voltage should be applied in the primary.

Figure 11A:
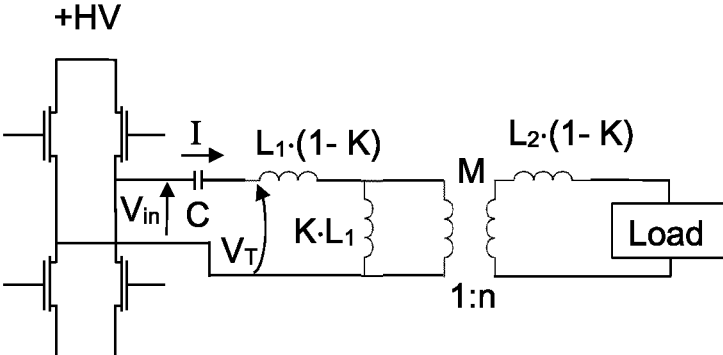

In order to overcome the above (unwanted) voltage drop, a resonating capacitor C is added at the primary side. FIG. 11a illustrates an embodiment operating at the resonant frequency, or above the resonant frequency, so as to obtain Zero Voltage Switching (ZVS) which results in lower switching losses and therefore higher efficiency of the system. In this embodiment, the impedance at the resonant frequency of capacitor C and the uncoupled inductance portion L1·(1−K) are partially compensating each other and therefore, there is no need to increase the input voltage at the primary. In this case, a square wave is applied to the primary from a full-bridge inverter 71, and only its first harmonic component (shown in FIG. 11b) will reach the primary, since the resonant circuit of capacitor C and the uncoupled inductance portion L1·(1−K) functions as a low-pass filter. This results in an increased voltage at the primary and effectively increases the magnitude the of power transfer to the secondary of the transformer. FIG. 11c shows the input current to the primary side. Operating at, or above, the resonance frequency reduces the power loss, and hence, increases the efficiency, thanks to the ZVS operation.

The synchronization pulses are processed to obtain an essentially square wave signal that independently operates the second full active bridge to feed the load with predetermined current originated from passing power from the AC power source to the second full active bridge, via the rotary transformer.

FIG. 12 illustrates an embodiment of operating in a resonant converter mode. In this case, the bridge at the primary operates as an inverter, generating an excitation voltage $V_T$, while the secondary bridge acts as a diode or a synchronous rectifier, feeding the current $I_L$ to the load (which is represented by an inductor L, followed in series with a resistor R). The control of the power level transferred to the secondary could be by a frequency shift, i.e. by increasing the excitation frequency, by a bipolar pulse modulated wave, or a combination of both.

Figure 13:
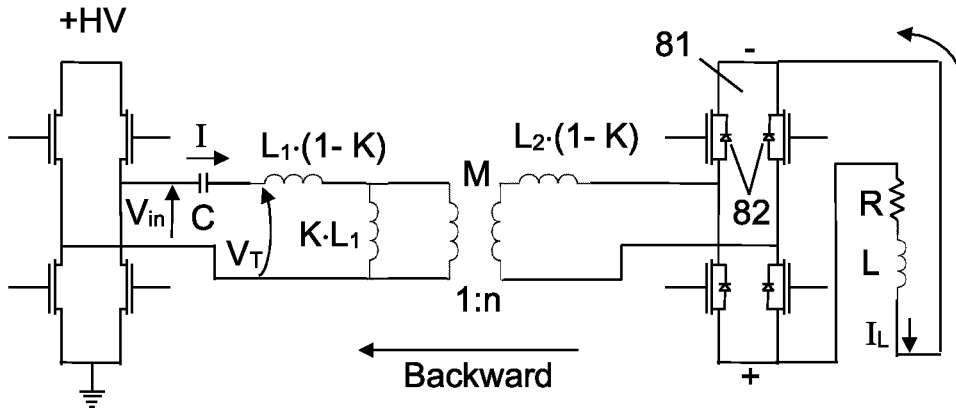
FIG. 13 illustrates power transfer from the secondary side back to the primary side.

When power transfer is required in the opposite direction (i.e., from the secondary side back to the primary side) the direction of the current flowing from the load should be reversed, as shown in FIG. 13. In this case, the secondary bridge acts as an inverter while the bridge at the primary operates as a synchronous rectifier. To accommodate the reverse current, the voltage polarity of the load needs to be flipped, which will cause the bus voltage to change from positive (FIG. 12) to negative (FIG. 13) across the inverter 81. However, since the full bridge 81 is sensitive to the voltage over it, the polarity of the voltage over the full-bridge inverter 81 must be maintained, in order to prevent short-circuit caused by the inherent diodes 82 of the MOSFET transistors that implement the full-bridge inverter 81.

Therefore, for power transfer in the backward direction, the port of the load inductor L which was connected to the positive voltage of the full-bridge inverter 81 should now be connected to its negative voltage.

Figure 14A:
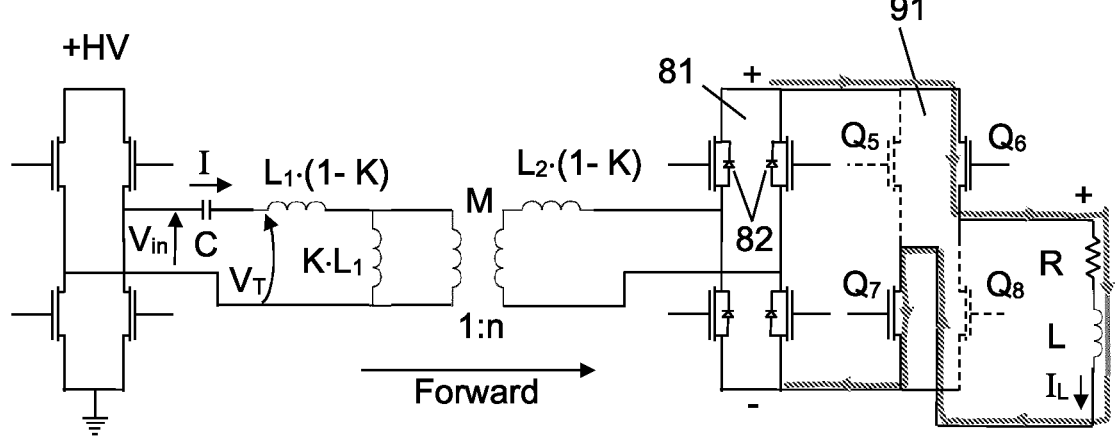
FIGS. 14A-14B illustrate an implementation of the circuitries shown in FIGS. 12 and 13, according to an embodiment of the invention.
Figure 14B:
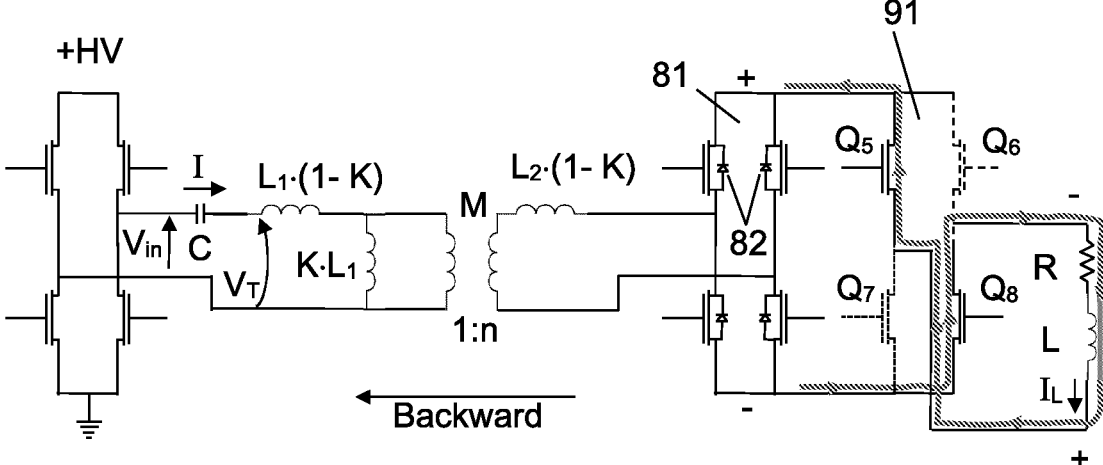

FIGS. 14A-14B illustrate an implementation of the circuitries shown in FIGS. 12 and 13, according to an embodiment of the invention that alleviate the voltage polarity problem. This implementation uses an additional full-bridge 91, which is switched according to the desired power transfer direction and functions as a polarity switch. This, bipolar-bidirectional bridge can accommodate both positive and negative bus voltages.

FIG. 14A shows power transfer in the forward direction (i.e., increasing the load current $I_L$), where transistors $Q_6$ and $Q_7$ are controlled to conduct, while transistors $Q_5$ and $Q_8$ are controlled to be at cutoff. In this state, the current $I_L$ flows into the load (to R and then to L) via transistors $Q_6$ and $Q_7$. FIG. 14B shows power transfer in the reverse direction (i.e., reducing the load current $I_L$), where transistors $Q_5$ and $Q_8$ are controlled to conduct, while transistors $Q_6$ and $Q_7$ are controlled to be at cutoff. In this state, the current $I_L$ flows out of the load (via R and out of L) via transistors $Q_5$ and $Q_8$.

Figure 15A:
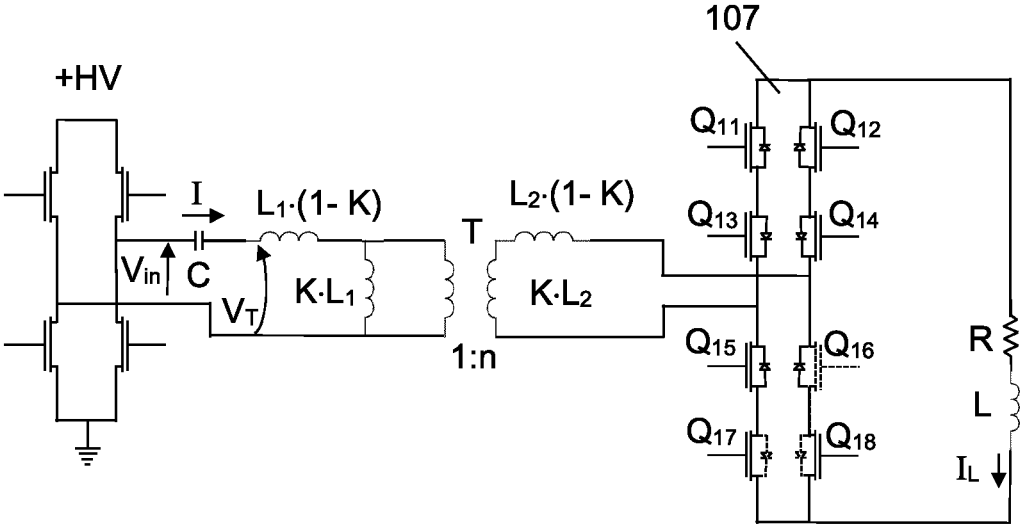
FIGS. 15A-15C illustrate an implementation of the circuitry shown in FIGS. 12 and 13, according to another embodiment of the invention.
Figure 16:
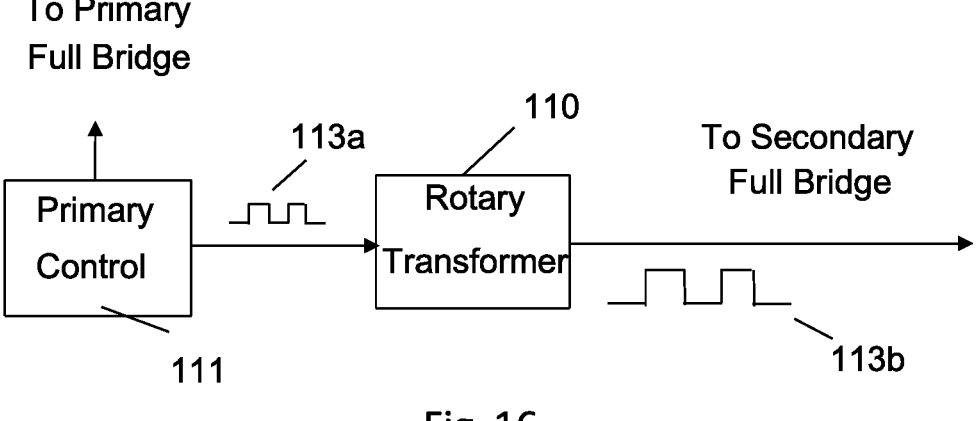
FIG. 16 shows a schematic illustration of passing the synchronization (command) signals from the primary side to the secondary side, according to an embodiment of the invention.
Figure 17:
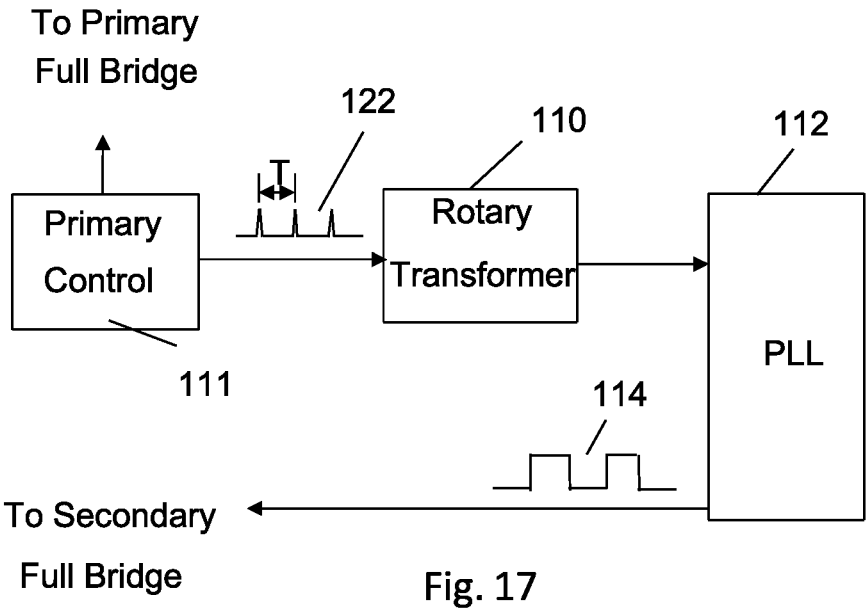
FIG. 17 shows a schematic illustration of passing the synchronization (command) signals from the primary side to the secondary side, according to another embodiment of the invention.

FIGS. 15A—illustrate an implementation of the circuitry shown in FIGS. 16 and 17, according to another embodiment of the invention. This implementation uses a bridge circuit 107, which is switched according to the desired power transfer direction and functions as a polarity switch, which is not sensitive to the polarity of the voltage over it and therefore, is suitable to carry out bidirectional power transfer.

Figure 15B:
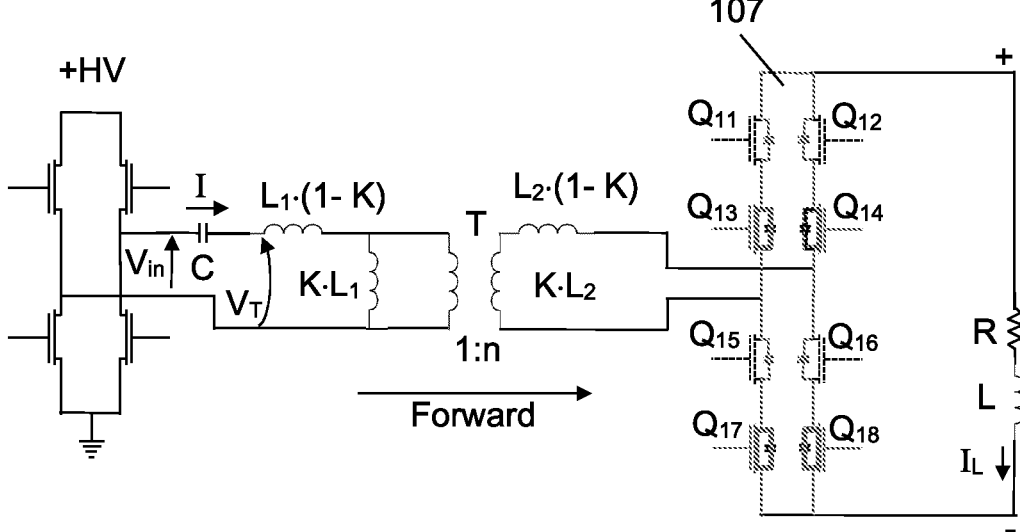
Figure 15C:
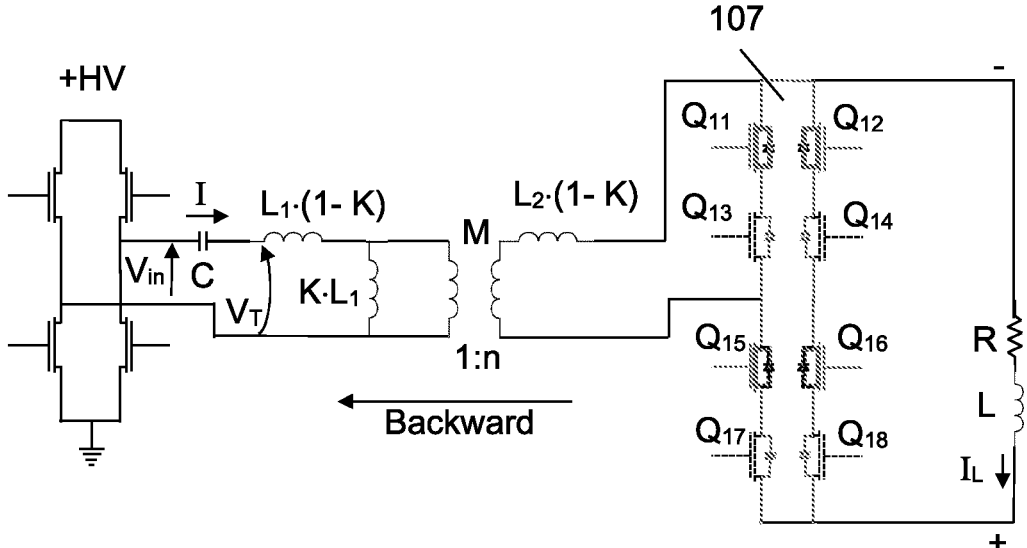

FIG. 15B illustrates the state of rectifier circuit 107 during forward power transfer. Here, the rectifier circuit 107 consists of 8 transistors $Q_{11}, \ldots, Q_1$ in a back-to back topology. During forward power transfer, MOSFET transistors $Q_{13}$, $Q_{14}$, $Q_{17}$, and $Q_{18}$ conduct (are effectively short-circuits), while MOSFET transistors $Q_{11}$, $Q_{12}$, $Q_{15}$, and $Q_{16}$ are not conducting. At this stage, the inherent diodes of the conducting MOSFET transistors $Q_{13}$, $Q_{14}$, $Q_{17}$, and $Q_{18}$ are neutralized (bypassed), while only the inherent diodes of the nonconducting MOSFET transistors $Q_{11}$, $Q_{12}$, $Q_{15}$, and $Q_{16}$ are active, and act as a diode bridge. This diode bridge rectifies the current of the secondary side and the rectified current $I_L$ enters the load (charge mode). A second bridge may be connected in tandem to the first bridge at the secondary side, which during forward power transfer, feeds a load or the rotor of the electric motor, such that current flows from the positive port of the synchronous rectifier into the load.

A second bridge at the secondary side is connected in tandem to the first bridge which during backward power transfer, feeds a load or the rotor the electric motor, such that current flows from the load into the positive port of the first bridge, the first bridge operates as an inverter that feeds an AC signal to the secondary winding of the transformer.

An optional improvement may be achieved by controlling the nonconducting MOSFET transistors $Q_{11}$, $Q_{12}$, $Q_{15}$, and $Q_{16}$ to conduct in parallel to the active rectification diodes, so as to obtain synchronous rectification and thereby, reducing the losses.

Figure 1:
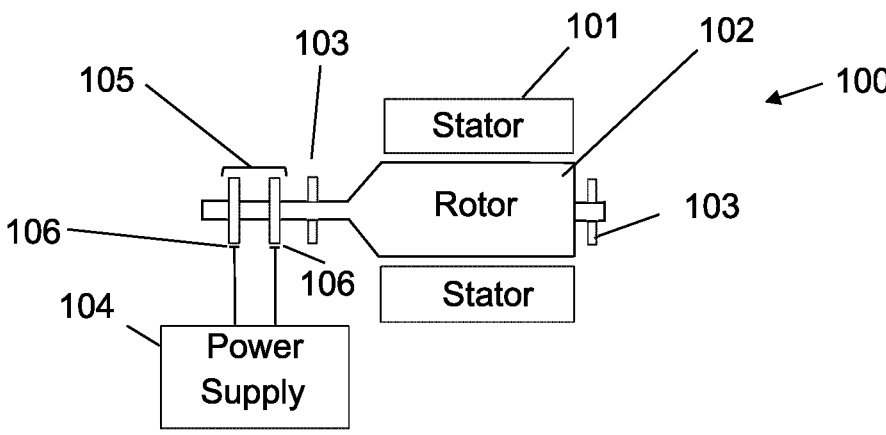
FIG. 1 (prior art) schematically illustrates a simplified cross-sectional view of DC-excited synchronous electric motors.
Figure 2:
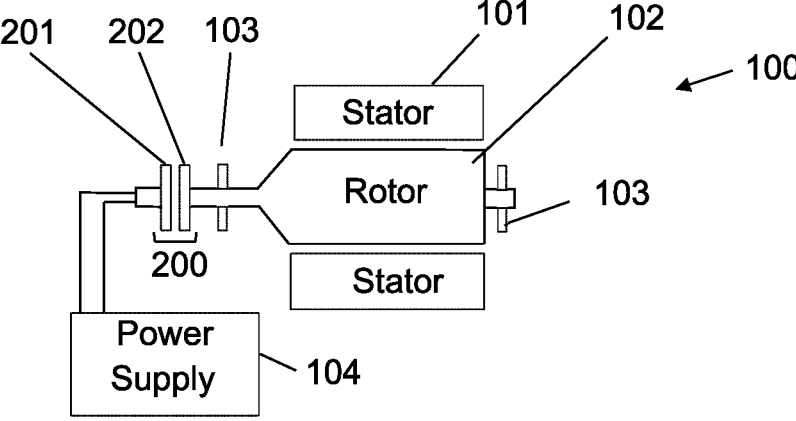
FIG. 2 (prior art) shows existing solutions for replacing the combination of brushes and slip-rings is using a rotary transformer.
Figure 3:
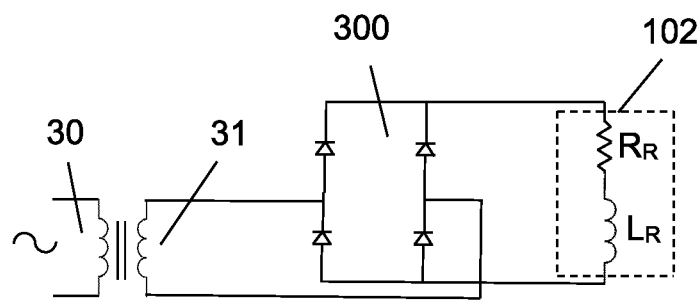
FIG. 3 (prior art) shows a rotary transformer used to feed DC current into the rotor by rectifying an AC current using diodes.

FIG. 1C illustrates the state of rectifier circuit 107 during power transfer in the reverse direction. During reverse power transfer, MOSFET transistors $Q_{11}$, $Q_{12}$, $Q_{15}$, and $Q_{16}$ conduct (are effectively short-circuits), while MOSFET transistors $Q_{13}$, $Q_{14}$, $Q_{17}$, and $Q_{18}$ are controlled to operate as an inverter. This "reversed" bridge acts as an inverter at the secondary side while the polarity of the voltage over the secondary is also reversed, and now the current $I_L$ leaves the load toward the positive port (discharge mode), so as to transfer energy from the secondary to the primary. The reverse polarity of the bus voltage is consistent with the polarity of MOSFETs $Q_{13}$, $Q_{14}$, $Q_{17}$, $Q_{18}$ connection.

The power transfer level of the inverter on the primary side may be controlled by shifting the switching frequency. In a resonating inverter, upon increasing the switching frequency, the phase of the current relative to the voltage is changed. This results in a lower effective power at the primary side. In this case, the inverter will generate a bipolar square pulse, which after passing the resonant circuit, is filtered and only the first harmonic (sine wave) passes to the secondary. The switching frequency may be in a range above the resonant frequency.

Another way to control the current of the inverter on the primary side, is to produce a bipolar pulse width modulated signal. In this case, the transistors that implement the inverter will be switched to generate a delay between the positive and the negative parts of the pulse, which effectively modulates the generated pulse. In this case, after passing the resonant circuit, the pulse width modulated signal is filtered and the first harmonic that passes to the secondary will have less power, depending on the level of modulation (i.e., on the delay that determines the duty cycle of the modulated signal).

It is also possible to combine between the two techniques and control the current by generating a pulse width modulated signal, along with shifting the switching frequency.

FIG. 16 shows a schematic illustration of passing the synchronization (command) signals from the primary side to the secondary side, according to an embodiment of the invention. In this example, a square wave synchronization (command) signal 113a is fed to the primary side via the rotary transformer 110 and received at the secondary side as signal 113b. A primary control circuit 111 controls the full bridge at the primary side to modify the phase of the primary inverter with respect to the synchronization (command) signal sent to the secondary side, so as to obtain a desired effect on the current provided to the rotor, such as increasing the current at a desired rate, decreasing the current at a desired rate, or even reversing its direction.

Figure 10C:
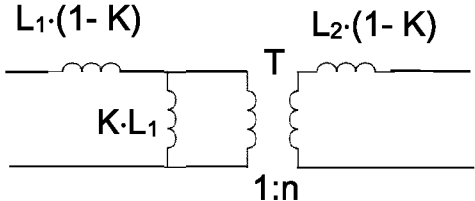

FIG. 17 shows a schematic illustration of passing the synchronization (command) signals from the primary side to the secondary side, according to another embodiment of the invention. In this example, the synchronization (command) signals are very short and simple pulse 122 rather than passing a rectangular pulse (113a, 113b in FIG. 10), which require a more complex circuitry to transfer from primary to secondary due to the fact that they contain a significant low frequency component as compared to the short pulses. The synchronization signals are transferred from the primary side via the rotary transformer 110 to a PLL circuit 112 at the secondary side and then, to the full bridge at the secondary side. The PLL circuit 112 at the secondary side reconstructs the full synchronization square wave (command) signals 114 required to control the current flowing in the rotor. Similarly, a primary control circuit 111 controls the full bridge at the primary side to modify the phase of the primary control signal with respect to the secondary, so as to obtain a desired effect on the current provided to the rotor, such as increasing the current at a desired rate, decreasing the current at a desired rate, or even reversing its direction.

Figure 18:
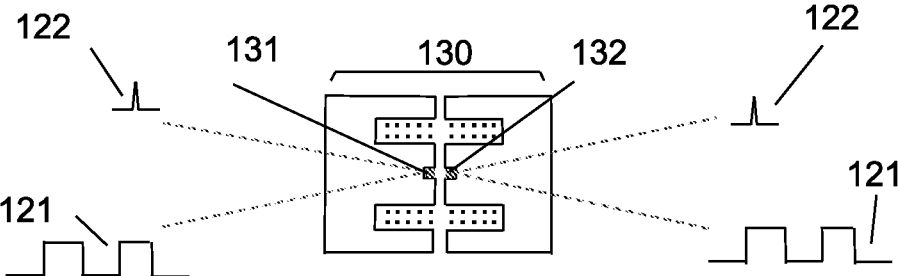
FIG. 18 shows a schematic illustration of passing the synchronization (command) signals from the primary side to the secondary side, using optical signals.

FIG. 18 shows a schematic illustration of passing the synchronization (command) signals from the primary side to the secondary side, using optical signals. In this example, the rotary transformer 130 is round and the wire turns in the primary and secondary sides are shown in a cross-sectional view, along with the air gap between the primary and the secondary sides. A LED 131 is mounted (in a niche formed) at the primary side and is used to transmit optical signals that carry the information of the pulses (rectangular or a narrow pulse) to be passed to the secondary side. A photodiode 132 is mounted (in a niche formed) at the secondary side and is used to receive the transmitted optical signals and detect the information carried by the pulses. The detected information (which may be in a form of a square wave 121 or a sharp short pulse 122) is used to control the current at the secondary side.

Figure 19:
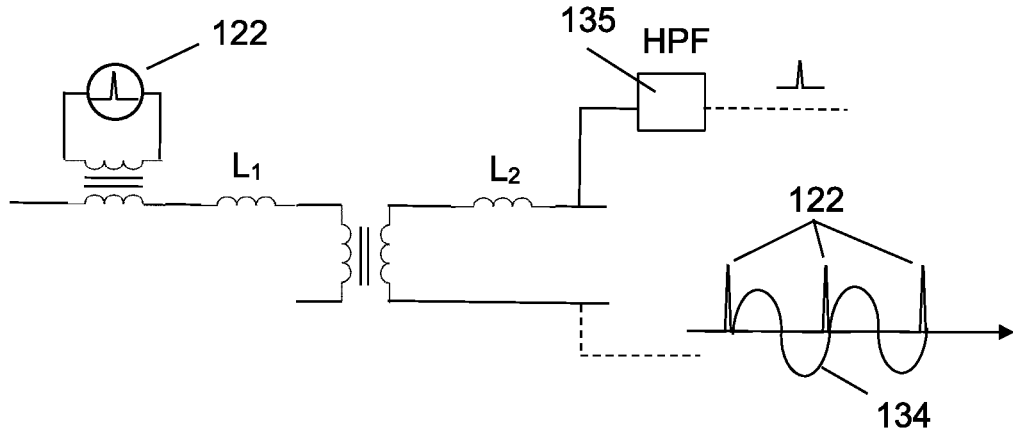
FIG. 19 shows a schematic illustration of passing the synchronization (command) signals from the primary side to the secondary side, using magnetic coupling.

FIG. 19 shows a schematic illustration of passing the synchronization (command) signals from the primary side to the secondary side, using magnetic coupling. In this example, it is more difficult to pass rectangular pulses via the magnetic field due to the lower frequency of the square wave signal. Therefore, the preferred way is to pass very short synchronization signals 122, carried by the sinusoidal wave 134 at a lower frequency, which is suitable to be passed by the magnetic coupling. At the secondary side, the sinusoidal wave 134 is filtered by a High-Pass filter 135 and the series of short pulses is reconstructed and passed to the PLL circuit described above.

Figure 20:
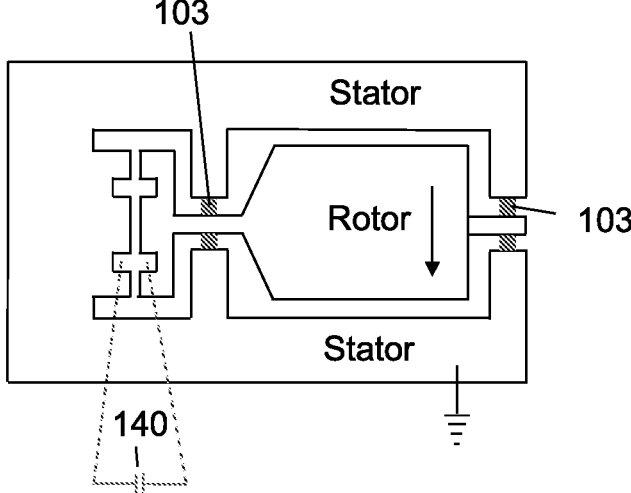
FIG. 20 shows a schematic illustration of passing the synchronization (command) signals from the primary side to the secondary side, using capacitive coupling.

FIG. 20 shows a schematic illustration of passing the synchronization (command) signals from the primary side to the secondary side, using capacitive coupling 140. In this example, it is more difficult to pass rectangular pulses via the induced electric field. Therefore, the preferred way is to pass very short pulses. The stator metal body is connected to the ground, as well as the metal body of the rotor (via the bearings 103). Typically, the air gap between the primary and the secondary of the rotary transformer is used as the capacitor through which the synchronization (command) signals pass from the primary side to the secondary side.

Figure 21:
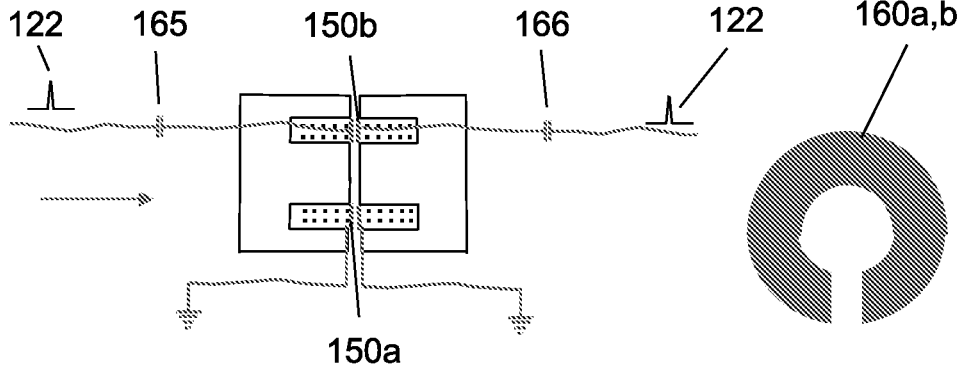
FIG. 21 shows a further improvement of passing the synchronization (command) signals from the primary side to the secondary side by using open ring electrodes.
Figure 21:
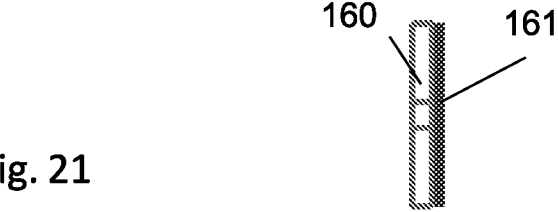

This arrangement may be further improved by using open ring electrodes (to avoid circulating current) 160a and 160b, as shown in FIG. 21. In this case, the synchronization pulses are coupled to the rotary transformer by capacitors 165 and 166 that transfer the high frequency components of the synchronization signals 122. An open ring electrode is mounted on each surface 150a, 150b of the rotary transformer which implements the capacitive coupling, on top of an insulating layer 161, such that each insulating layer prevents contact between the open ring electrode (160a, 160b) and the wires 151a, 151b of each side of the rotary transformer. This arrangement does not deteriorate the operation of the rotary transformer, since the presence of the open ring electrodes and the insulating layers is transparent to the magnetic flux between the windings at each side of the rotary transformer.

Figure 22:
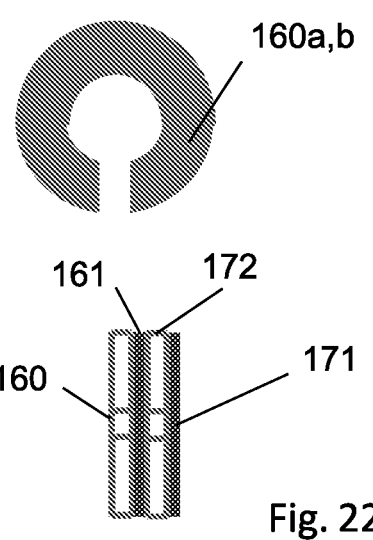
FIG. 22 illustrates another improved arrangement, which is essentially similar to the arrangement shown in FIG. 21, with the addition of a guard layer at each side of the rotary transformer.

FIG. 22 illustrates another improved arrangement for the capacitive electrodes, which is essentially similar to the arrangement shown in FIG. 16, with the addition of a guard layer at each side of the rotary transformer. The function of the guard is to prevent penetration of the main power signal into the synchronization channel. In this case, in addition to the open ring electrode 160 and an insulating layer 161, there is an additional open ring electrode 172, which is grounded and hence functioning as a guard layer, and an additional insulating layer 171. The additional open ring electrode 172 and insulating layer 171 are sandwiched between each open ring electrode 160 and the corresponding surface of the rotary transformer. The opening in each electrode is important to prevent short-circuit and preferably, should not overlap one with the other.

Figure 23A:
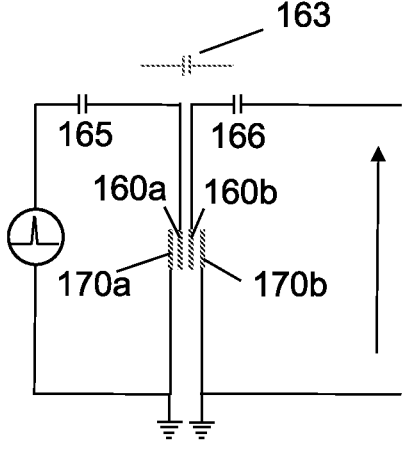
FIGS. 23A-23B illustrate an equivalent circuit of the arrangement of FIG. 16.
Figure 23B:
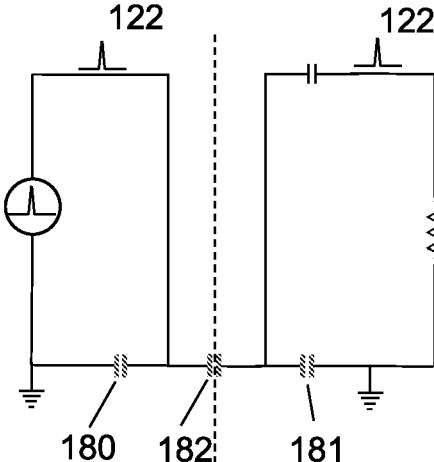

FIGS. 23A-23B illustrate an equivalent circuit of the arrangement of FIG. 22. FIG. 23A represents in a simplified manner the relative positions of the capacitive electrodes 160a and 160b and the guard electrodes 170a and 170b. The transmission of the synchronization signal from primary to secondary is illustrated in the simplified equivalent circuit shown in FIG. 23B. Capacitance 180 represents the capacitance of the primary guard layer 170a to ground while capacitance 181 represents the capacitance of the secondary guard layer 170b to ground, taking into account the insulation layers 171a, 171b. Capacitance 182 represents the capacitance transmitting and receiving open ring (capacitive) electrode 160a, 160b. The synchronization signal 122 is injected between the capacitances 180 and 182 and is received at the secondary after passing the capacitive voltage divider 181 182. The link capacitance 182 may be in the order of 50-100 pF, which is a relatively low capacitance. However, since the pulses that pass are short pulses, this capacitance is sufficient for introducing a low impedance to the short pulses (that contain high frequency components).

Therefore, the solution of using short pulses and reconstructing them by a PLL circuit is preferable for such a capacitive coupling.

Figure 24:
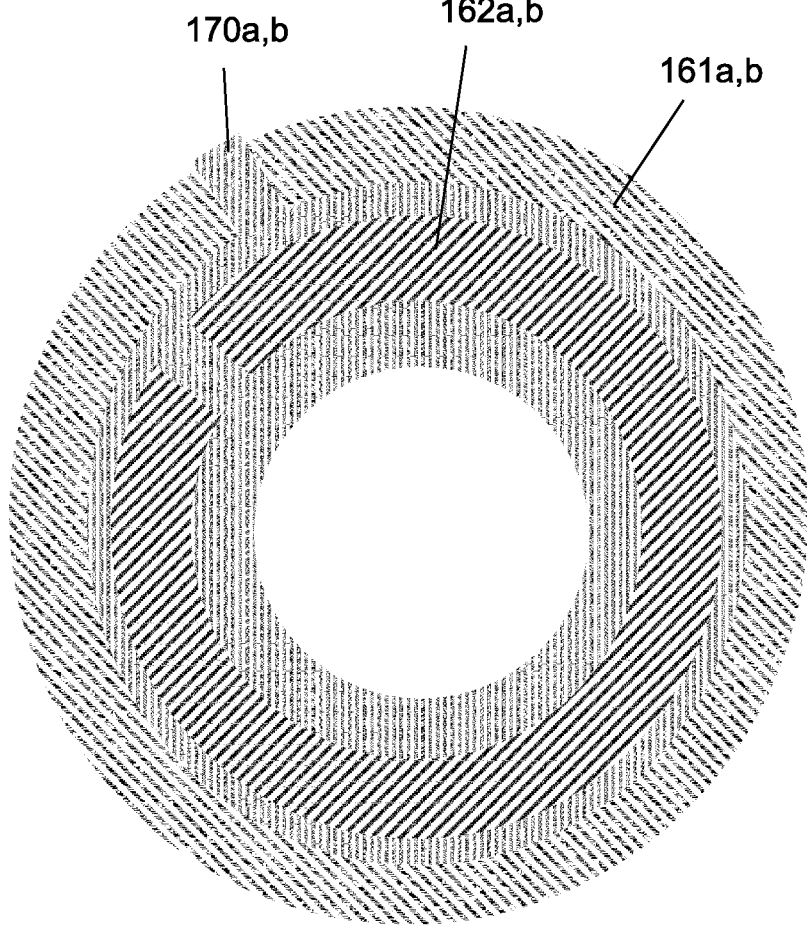
FIG. 24 shows a segmented ring electrode that enables bidirectional power transfer.

FIG. 24 shows a segmented capacitive ring electrode including, in this illustrated case, two independent and electrically isolated conductive layers 160A, 161A which are adhered to an isolating layer 190A applying e.g. a Printed Circuit Board (PCB) technology. This structure allows bidirectional data transfer which is accomplished by utilizing one of the conductive strips to transfer data capacitively from the stator to rotor (as discussed above), while the other segment is used to transfer data from the rotor to the stator.

The above examples and description have of course been provided only for the purpose of illustrations, and are not intended to limit the invention in any way. As will be appreciated by the skilled person, the invention can be carried out in a great variety of ways, employing more than one technique from those described above, all without exceeding the scope of the invention.

The invention claimed is:

1. A method for controlling a synchronized bidirectional dual active bridge power transfer system, comprising:
   a) providing a transformer having a primary side and a secondary side;
   b) connecting a first inverter being a first full active bridge between a DC power source and said primary side and driven by a controller;
   c) connecting a second inverter being a second full active bridge to said secondary side and feeding an output current to a load via said secondary side;
   d) continuously transmitting, by a control circuit and via said transformer, synchronization pulses at a switching frequency of said inverters, to operate said second full active bridge independent of said first full active bridge;
   e) processing said synchronization pulses to obtain an essentially square wave signal that independently operates said second full active bridge to feed said load with a predetermined output current; and
   f) at the primary side, controlling a phase and an operating duty cycle of said first full active bridge, being in synchronization with said synchronization pulses, to thereby vary the output current provided by said second full active bridge to said load.

2. The method according to claim 1, wherein the synchronization pulses are in the form of a square wave signal or short pulses that pass via the transformer from the primary side to the secondary side and processed at said secondary side to reconstruct the square wave signal at said secondary side.

3. The method according to claim 1, wherein a phase of controller signals of the primary side, with respect to the synchronization pulses, determines a polarity and a magnitude of the voltage that is being developed at an output of the secondary side.

4. The method according to claim 1, wherein for an inductive load, whenever an average voltage of the second inverter is positive and therefore, dI/dt is positive, a current load I flowing in the secondary side will increase and whenever the average voltage of the second inverter waveform is negative, dI/dt is negative and the load current flowing in the secondary side will decrease.

5. The method according to claim 1, wherein a primary control circuit controls the full bridge at the primary side to modify a phase of the generated waveform with respect to a controller synchronization pulse, so as to increase the load current at a desired increasing rate, decrease the load current flowing in the secondary side at a desired decreasing rate, or reverse the load current direction.

6. A method for controlling an electric motor by implementing a synchronized bidirectional rotary dual active bridge, comprising:
   a) providing a rotary transformer having a primary side and a secondary side;
   b) connecting a first inverter being a first full active bridge between an DC power source and said primary side;
   c) connecting a second inverter being a second full active bridge to said secondary side and feeding an output current to a rotor of said electric motor via said secondary side;
   d) continuously transmitting, by a control circuit and via said rotary transformer, synchronization pulses at a switching frequency of said inverters, to operate said second full active bridge independent of said first full active bridge;
   e) processing said synchronization pulses to obtain an essentially square wave signal that independently operates said second full active bridge to feed said rotor with predetermined output current originated from passing power from said DC power source to said second full active bridge, via said rotary transformer; and
   f) at the primary side, controlling a phase and an operating duty cycle of said first full active bridge, being in synchronization with said synchronization pulses, to thereby vary the output current provided by said second full active bridge to said rotor.

7. The method according to claim 6, wherein synchronization pulses from the primary side to the secondary side are passed using one or more of the following:
   optical pulses;
   magnetic coupling; and
   capacitive coupling.

8. The method according to claim 6, wherein an open ring electrode is mounted on each surface of the rotary transformer which implements the capacitive coupling, on top of an insulating layer.

9. The method according to claim 6, wherein a guard layer is added at each side of the rotary transformer.

10. The method according to claim 6, wherein a segmented open ring electrode is mounted on each surface of the rotary transformer, which implements the capacitive coupling, on top of an insulating layer, to thereby allow multichannel or bidirectional data transfer.

11. The method according to claim 6, wherein the primary side further comprises a serially connected resonating capacitor at an input of the rotary transformer, for obtaining resonance with serial stray inductance caused by weak magnetic coupling, at a switching frequency, thereby operating as a bidirectional resonant converter.

12. The method according to claim 6, wherein an additional full bridge is connected in tandem to the second full active bridge, which during forward power transfer, feeds a load or the rotor of the electric motor, such that current flows from the positive port of said synchronous rectifier into said load.

13. The method according to claim 12, wherein a power transfer level of the inverter on the primary side is controlled by shifting the switching frequency, to thereby vary the current or by using a frequency range being above a resonant frequency.

14. The method according to claim 12, wherein the inverter on the primary side is controlled to produce a bipolar pulse width modulated signal, to thereby generate a duty cycle which varies the load current.

15. The method according to claim 6, wherein an additional full bridge is connected in tandem to the second full active bridge which during backward power transfer, feeds a load or the rotor the electric motor, such that current flows from said load into the positive port of said first bridge, said first bridge operates as an inverter that feeds an AC signal to the secondary winding of said transformer.

16. The method according to claim 6, wherein a synchronous rectifier feeds a load or the rotor of the electric motor via an additional full-bridge consisting of two pairs of opposing transistors and functioning as a polarity switch, such that:

during forward power transfer, a) controlling two non-opposing transistors, one from each pair of said full-bridge, to conduct while controlling the other two non-opposing transistors not to conduct, thereby allowing current to flow from a positive port of said synchronous rectifier into said load; and during backward power transfer, b) controlling the other two non-opposing transistors, one from each pair of the full-bridge, to conduct while controlling the remaining two non-opposing transistors not to conduct, thereby reversing the voltage polarity of the load, with respect to the voltage polarity of the second active bridge, and allowing current to flow from the load into the negative port of said full bridge to facilitate power transfer to the primary, by the secondary full active bridge while maintaining a positive voltage on the secondary full active bridge.

17. The method according to claim 6, wherein the second active bridge is a bi-polar bridge, that can accommodate bi-polar voltage across it whereas each of half bridges of the active bridge, consists of an upper and a lower pair of transistors in a back-to back connection, such that said bi-polar second active bridge is bidirectional and can accommodate bipolar voltage across it, while:

during forward power transfer, c) controlling the lower transistors of each back-to-back connected pairs of said bi-polar second active bridge to conduct, while controlling the other two opposing transistors of said pair not to conduct, thereby applying a short-circuit on internal diodes of conducting transistors, and thus, forming a diode rectifier which allows the current to flow from the secondary side of said transformer via said internal diodes being arranged as a bridge, into said load;

during backward power transfer, concurrently:

d) controlling the upper back-to-back transistor pairs to conduct; and e) controlling remaining transistors to operate as an inverter such that current is flowing out of the load, converted to an AC signal and fed to a secondary winding of said transformer, thereby reversing a polarity of the voltage across bidirectional and bipolar bridge which now acts as an inverter and thereby, allowing current to flow from the load to the secondary side and then, to the primary side of transformer.

18. A synchronized bidirectional dual active bridge power transfer system, comprising:

a) a transformer having a primary side and a secondary side;

b) a first inverter being a first full active bridge, connected between a power source and said primary side;

c) a second inverter being a second full active bridge, connected to said secondary side and feeding a load current via said secondary side;

d) a control circuit for:

d1) continuously transmitting, via said transformer, synchronization pulses at a switching frequency of said inverters, to operate said second full active bridge independent of said first full active bridge;

d2) processing said synchronization pulses to obtain an essentially square wave signal that independently operates said second full active bridge to feed said load with predetermined load current originated from passing power from said DC power source to said second full active bridge, via said transformer; and d3) controlling, at the primary side, a phase and an operating duty cycle of said first full active bridge, being in synchronization with said synchronization pulses, to thereby vary the load current provided by said second full active bridge to said load.

19. The system according to claim 18, further comprising a PLL circuit for reconstructing a square wave signal at the secondary side.

20. A system for controlling an electric motor by implementing a synchronized bidirectional rotary dual active bridge, comprising:

a) a rotary transformer having a primary side and a secondary side;

b) a first inverter being a first full active bridge, connected between an AC power source and said primary side;

c) a second inverter being a second full active bridge, connected to said secondary side and feeding the load current to a rotor of said electric motor via said secondary side;

d) a control circuit, for:

d1) continuously transmitting, via said rotary transformer, synchronization pulses at a switching frequency of said inverters, to operate said second full active bridge independent of said first full active bridge;

d2) processing said synchronization pulses to obtain an essentially square wave signal that independently operates said second full active bridge to feed said rotor with predetermined load current originated from passing power from said AC power source to said second full active bridge, via said rotary transformer; and d3) at the primary side, controlling a phase and an operating duty cycle of said first full active bridge, being in synchronization with said synchronization pulses, to thereby vary the load current provided by said second full active bridge to said rotor.

* * * * *